July 11, 1972  V. N. PETERS  3,676,237

METHOD OF MAKING NYLON MONOFILAMENT SINKING FISHING LEADER

Filed Nov. 17, 1970

Virgil N. Peters
INVENTOR.

BY Clarence A. O'Brien
and Harvey B. Jacobson
Attorneys

United States Patent Office 3,676,237
Patented July 11, 1972

3,676,237
METHOD OF MAKING NYLON MONOFILAMENT SINKING FISHING LEADER
Virgil N. Peters, R.F.D. 1, Box 4,
Stevens Point, Wis. 54423
Filed Nov. 17, 1970, Ser. No. 90,327
Int. Cl. B29c 23/00; A01k 91/00
U.S. Cl. 156—2                                    5 Claims

ABSTRACT OF THE DISCLOSURE

A sinking fishing leader of uniform density and the method of making same from level or tapered extruded nylon monofilament by chemical treatment to produce a sinking leader used for dry fly and wet fly fishing. The leaders are made in various lengths and with various butt and tip diameters and are dyed in various colors.

BACKGROUND OF THE INVENTION

Fishing leaders presently available for dry fly and wet fly fishing are generally constructed of nylon monofilament which floats on the water surface. This creates several problems mainly the fact that the fish are not as responsive to artificial flies, bait or lures when fishing leaders float on the surface of the water as they do not have a natural effect and they also reflect a good deal of light thereby making it difficult to catch trout or other types of wary fish. Looking at it from the point of view of the fish, there is something "fishy" about a floating leader, but when the leader sinks beneath the surface it becomes nearly invisible with an obvious advantage to the fisherman.

In the past, dry and wet fly fisherman throughout the world have tried to sink nylon fishing leaders by prebuffing the leaders with steel wool, sandpaper and even by applying detergent and clay onto the surface of the leader. Buffing and sandpaper only produced a weakened leader, which did not sink. Because nylon is highly impervious to water, buffing or sandpapering a leader to absorb water was impractical and did not produce a sinking leader, also this treatment tended to greatly weaken the nylon leader. The process of this invention relates to the method of making or producing a sinkable nylon leader which maintains a very high percentage of its before treatment strength. The leader of this invention is quite advantageous and should prove to be a boon to those fishing enthusiasts who heretofore have been less successful in trout fishing than they might have expected to be. MacAllister, U.S. Pat. No. 2,559,080, discloses a method of etching a nylon filament for use as a fishing line. This disclosure is an improvement upon the concept disclosed in the MacAllister patent which is incorporated herein by reference.

SUMMARY AND OBJECTS OF THE INVENTION

An object of this invention is to provide a method of treating a nylon monofilament leader which floats so that it becomes a sinking leader for use in dry fly and wet fly fishing.

The leader can be produced in numerous shapes and lengths ranging from basically an elongated cylindrical length of etched nylon filament to a tapered length of nylon filament in lengths ranging anywhere from 6 feet to 12 feet, with various butt and tip diameters which are dyed in various colors One advantage of the invention is that fact that when a leader sinks beneath the surface of the body of water it becomes nearly invisible, an obvious advantage is to angler.

Another advantage is that the chemical treatment which etches and ruptures the outer skin or surface causes it to pick up algae and other microscopic particles and organisms which frequently fishing waters thereby sinking the leaders. The process of this invention prepares the surface of the nylon leader most adequately so that the clinging algae and other microscopic particles act as a wetting agent or blotter to absorb water and sink the leader.

Another advantage is the fact that the etched surface of the leader does not form a magnified silhouette due to the surface film which in general adheres to nylon filaments produced in the standard method, that is, those that are extruded to such a high degree of gloss that they resemble an enamel surface.

Another advantage is the fact that it is a glint free leader as the surface of the leader does not reflect light rays which frighten fish.

Another advantage is that fly fishermen can now use larger tipped diameters when fishing small flys due to the sinking feature.

Another advantage of this leader is the fact that since it is etched it will hold knots tied into it much better than the usual nylon monofilament leader.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
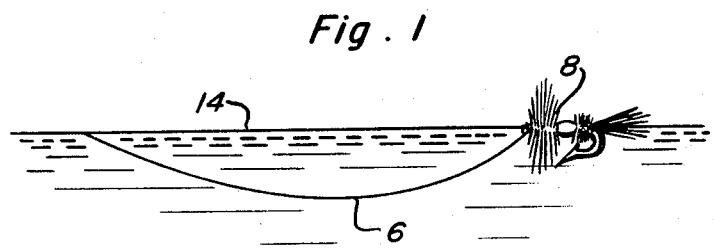
FIG. 1 is a schematic view of the sinking fishing leader of this invention used in dry fly fishing.
Figure 2:
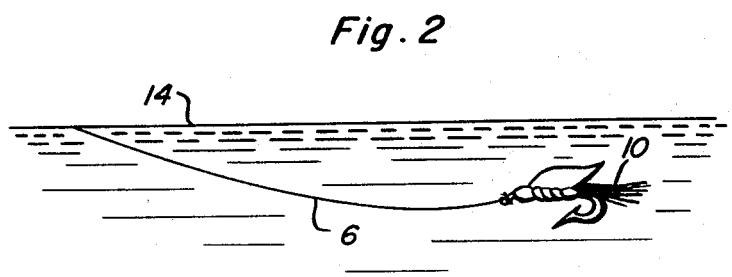
FIG. 2 is a schematic view of the sinking fishing leader of this invention used in wet fly fishing.

Referring to the drawings, FIGS. 1 and 2 depict two of the applications of this sinkable nylon leader. First application is in dry fly fishing wherein the leader 6 is submerged in the water and the dry fly, lure or bait 8 floats on the surface of the water 14. FIG. 2 is similar to FIG. 1 except that a wet fly, lure or bait 10 is fastened to leader 6. In both instances, a fishing rod includes the usual fishing line attached thereto and the usual line floats but the wet fly and leader sinks beneath the surface of the water.

Figure 3:
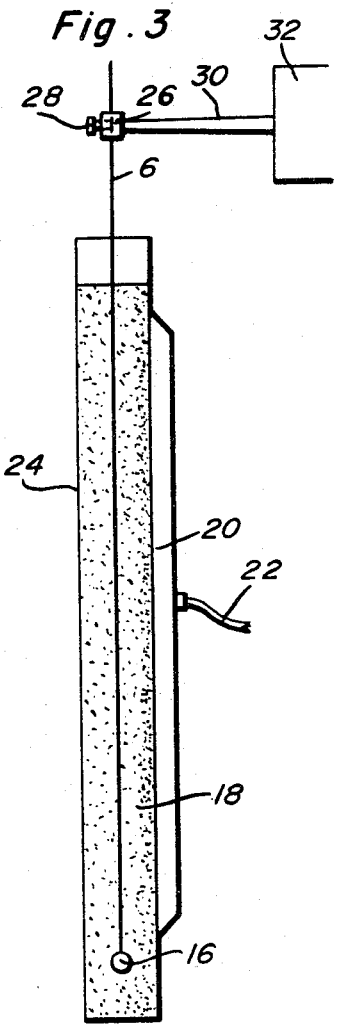
FIG. 3 is a schematic view of the chemical solution tank and leader.
Figure 4:
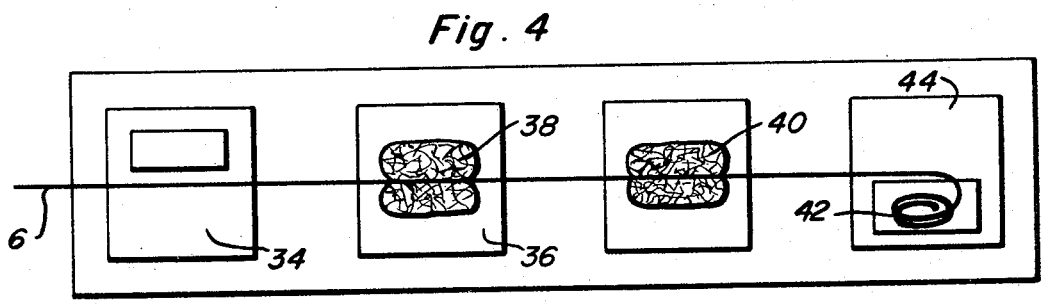
FIG. 4 is a schematic view of the various stations that the nylon leader passes through in order to treat the leader so that it becomes a sinkable nylon leader.

FIG. 3 illustrates the first step in the process of etching the leader 6 which is in the form of a nylon monofilament. The filament is weighted with a weight 16 suspended from the end of the filament 6 and the weighted filament is suspended in a liquid acid solution 18 corrosive to the nylon monofilament such as a mixture of 90% phenol and 10% water. The solution 18 is heated to 120° F. by an electric heater 20 which has a power cord 22 attached thereto with the heater 20 being attached vertically to the outside of a tank 24. The heater serves the purpose of maintaining the temperature of the solution relatively constant thereby providing a uniform rate of etching. As seen in FIG. 3 the nylon filament 6 passes through a clamping mechanism 26 which includes a set screw 28 which locks the filament to the clamping mechanism which is attached to an arm 30 that is part of a raising mechanism 32 which withdraws the filament from the solution at a controlled rate. If the speed of the raising mechanism is constant, the filament will then take on a tapered configuration. However, it is possible to adjust the speed so as to merely etch the filament and not taper it inasmuch as the area of the filament longest exposed to the solution will be the area of greatest corrosion, that is, the narrowest diameter. Each variation in speed of withdrawal will vary the end diameter of each filament. The faster the withdrawal the less corrosive action, resulting in a small amount of taper. A slower withdrawal speed will result in more corrosive action to the filament resulting in a smaller size filament.

The foregoing procedure is similar to that disclosed in MacAllister 2,559,080. However, in that patent both air and water were excluded by immediately immersing the filament in mineral oil. In this invention the filament 6 comes out of the solution 18 and enters a heated air space 34 maintained at approximately 100° F. This retards hardening of the residue on the filament which will occur if exposed to a lower room temperature and also holds the filament in a semi-soft condition in preparation for the next step. After passing through the heated air the filament 6 enters a 50% water and 50% ethylene glycol mixture heated to 90° F. in a tank 36 and at the same time the filament is also compressed between two pads of fine steel wool 38. The combination of warm acid solution 18 softening the filament, warm air at 34 and warm water and glycol mixture at 36 keeping it in this state, the use of steel wool 38 alters the surface of the filament. At this state in the process, the filament is similar to a rat tail file; it has a bristled textured finish.

The next step is to wipe the foreign materials from the filament. In order to accomplish this the filament 6 passes through pads of dry fine steel wool 40 for the final machine cleaning. After the entire filament is passed through the final steel wool pads 40, the manufacture of the tapered sinking leader is nearly complete. In its present state, however, the filament still has a small amount of residue remaining on it, and is weaker than it was before the manufacturing process. Consequently, the filament is coiled at 42 and placed in a solution of cold water and detergent in tank 44. It soaks there for about four hours before being washed, rinsed and hung out to dry. Cleaning the leader is important because it was discovered that a filament allowed to soak in the detergent solution will regain much of the tensile strength it had prior to its acid treatment. Strength retention figures indicate that the nylon is indeed reconditioned during the detergent soaking cycle. As an example, a 12 foot 6 inch filament, before cleaning, will measure 12 feet after which clearly indicates an increase in the density of the filament as well as an increase in its strength.

Figure 5:
FIG. 5 is a magnified view of a section of the treated nylon leader.

The chemical treatment prepares the surface of the nylon leader most adequately so that algae and other microscopic particles are either absorbed or adhere to the leader thereby helping to sink it. As illustrated in FIG. 5, the outer surface of the nylon filament 6 is etched or ruptured very minutely thereby producing a textured external finish 46 to the nylon fishing leader. As stated, the chemical treatment that etches and ruptures the outer skin of the nylon causes it to absorb water and pick up algae and other microscopic particles and organisms that frequent fishing waters. Ordinarily there is little clingable surface on regular nylon leaders for this matter to cling upon, since conventional nylon fishing leaders are extruded, thus providing high gloss enamel like finishes. In the past, dry and wet fly fishermen throughout the world have tried to sink nylon fishing leaders by prebuffing the leaders with steel wool, sandpaper, or even by applying detergent and clay to the surface of the leader. Buffing and sandpaper only produce a weakened leader that does not sink, as nylon is highly impervious to water, so the result is that buffing and sandpapering also weaken the strength of the leader. In the present invention, the strength is quite similar to the strength of untreated nylon due to the fact that the process includes the soaking of the nylon in the detergent water mixture for a number of hours. The process which includes the etching in combination with the detergent soaking results in a nylon filament which is quite strong and also sinkable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A process of treating linear polymer nylon filaments including the steps of:
   (a) etching said filament in a heated acid solution;
   (b) passing the etched filament through a heated air space immediately after withdrawal from the acid solution;
   (c) passing the heated, etched filament directly from the heated air space to a water and ethylene glycol mixture at the same time compressing the filament between two pads of fine steel wool;
   (d) passing the filament between a second set of fine steel wool pads to remove foreign material;
   (e) coiling the filament and soaking it in a detergent and water solution; and
   (f) drying the etched filament.

2. The process in accordance with claim 1 including the step of heating the acid solution to approximately 120° F. to increase the etching speed of the filament.

3. The process in accordance with claim 1 wherein the step of passing the filament through the heated air space includes maintaining the air space at approximately 100° F. in order to retard the hardening of the acid solution residue and therefore hold the filament in a semi-soft condition.

4. The process in accordance with claim 1 wherein the step of etching includes maintaining the solution at approximately 120° F. with the solution being approximately 90% phenol and 10% water.

5. The process in accordance with claim 1 wherein the step of soaking the coiled filament in a cold detergent and water solution includes soaking for approximately 4 hours thereby restoring the strength to the nylon filament which was weakened during the etching step.

References Cited

UNITED STATES PATENTS

| 2,559,080 | 7/1951 | MacAllister | 156—7 |
| 2,774,173 | 12/1956 | Thienemann | 43—44.98 |
| 3,060,550 | 10/1962 | Smith | 156—7 UX |

ROBERT F. BURNETT, Primary Examiner

R. O. LINKER, Jr., Assistant Examiner

U.S. Cl. X.R.

43—44.98; 161—179, 180; 156—7